March 4, 1941.   C. N. BEBINGER   2,234,071
LOADING APPARATUS
Filed Sept. 30, 1939   8 Sheets-Sheet 1

Inventor
Charles N Bebinger
By
Freasor and Bishop
Attorneys

March 4, 1941.　　C. N. BEBINGER　　2,234,071
LOADING APPARATUS
Filed Sept. 30, 1939　　8 Sheets-Sheet 3
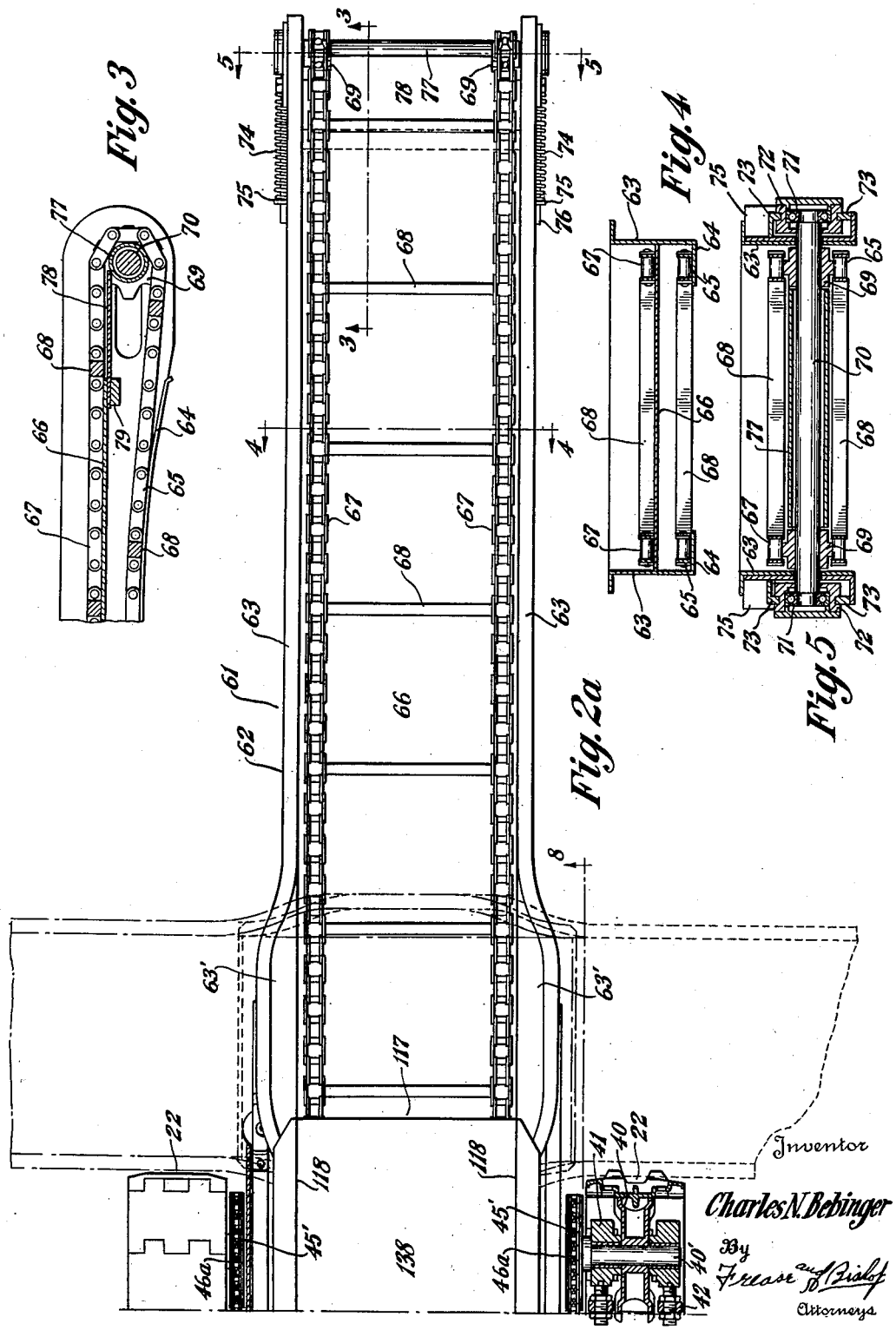
Inventor
Charles N. Bebinger Inventor
Charles N. Bebinger
By Frease and Bishop
Attorneys

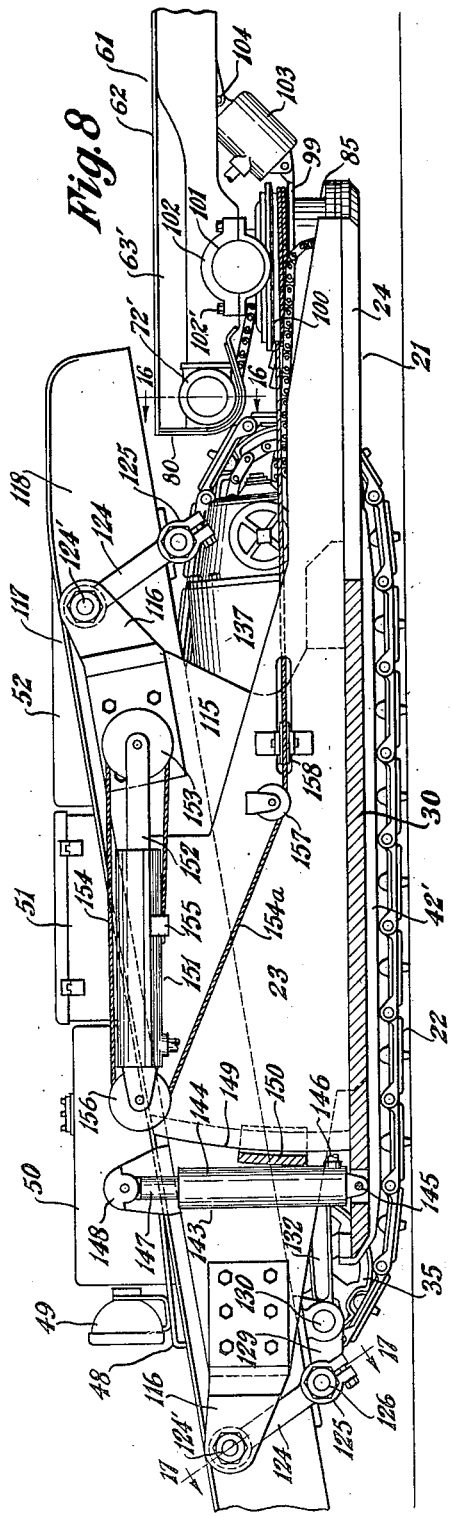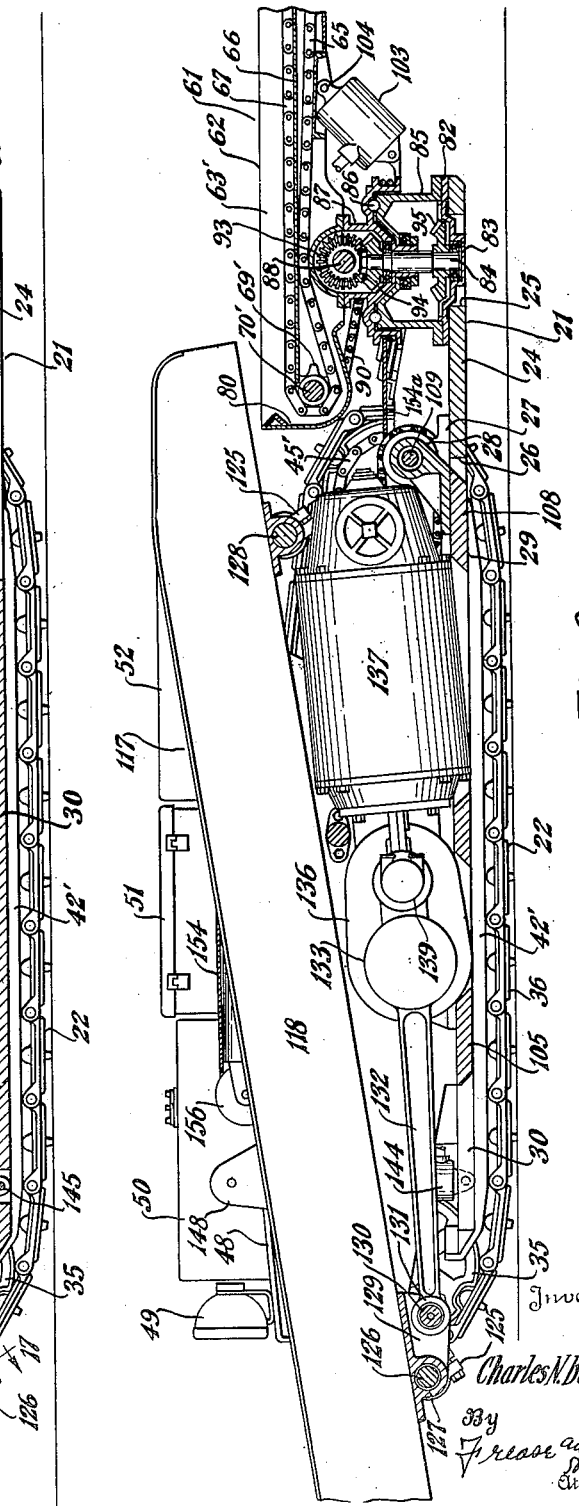

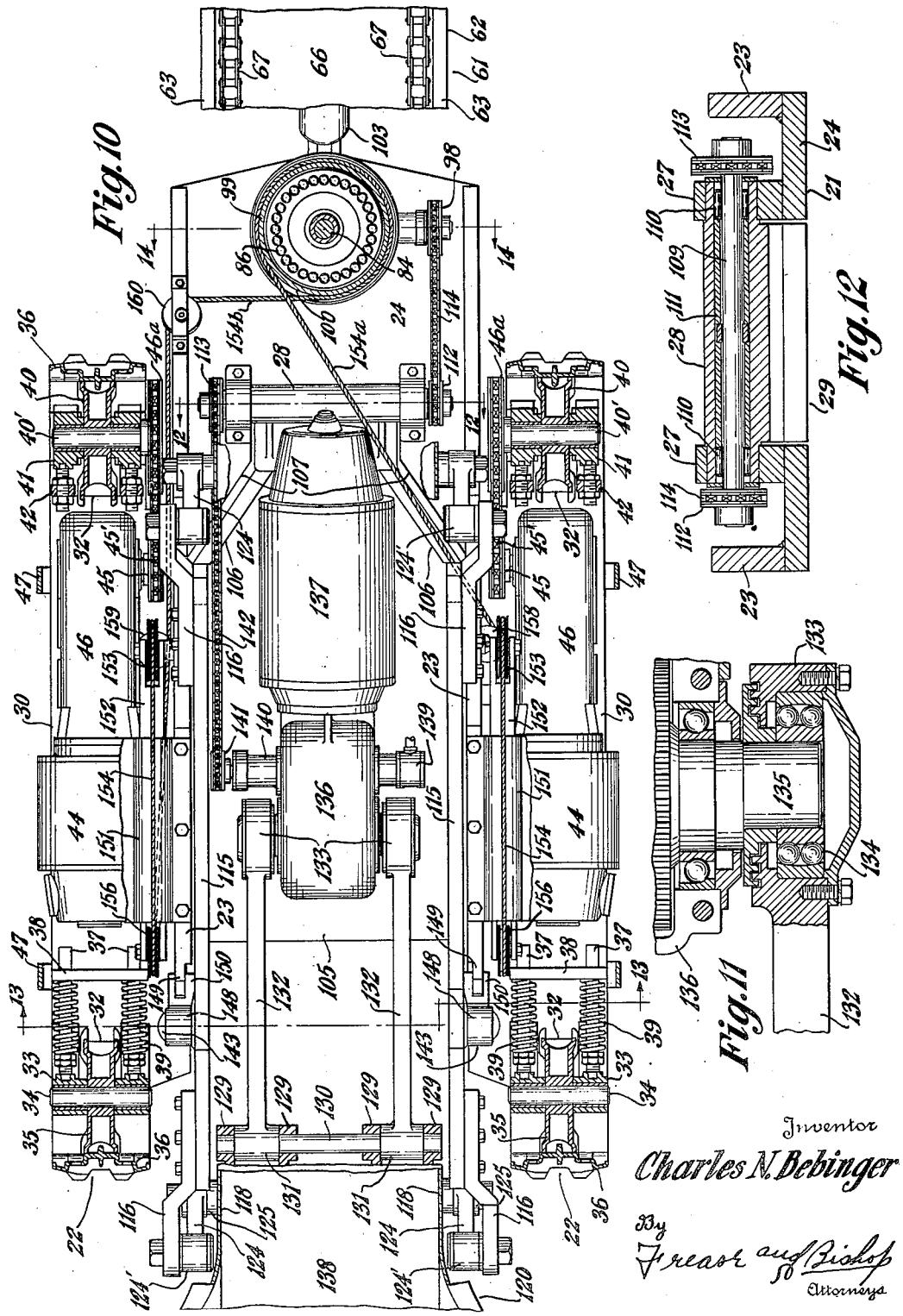

March 4, 1941.  C. N. BEBINGER  2,234,071
LOADING APPARATUS
Filed Sept. 30, 1939   8 Sheets-Sheet 7

Inventor
Charles N. Bebinger
By Frease and Bishop
Attorneys

March 4, 1941.  C. N. BEBINGER  2,234,071
LOADING APPARATUS
Filed Sept. 30, 1939  8 Sheets-Sheet 8
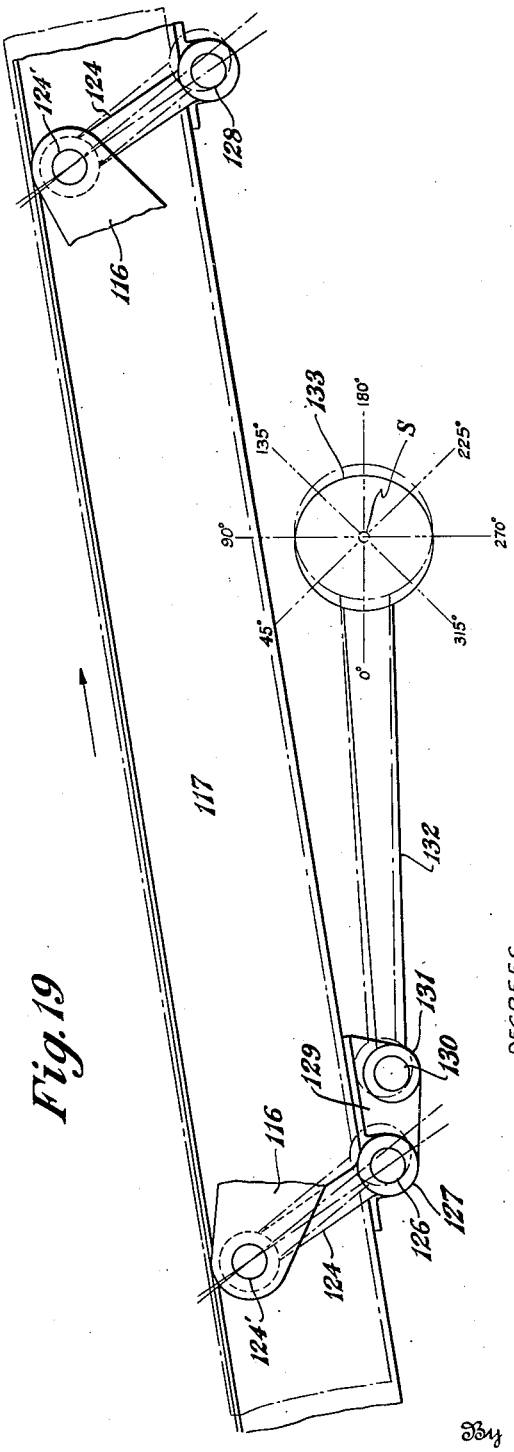
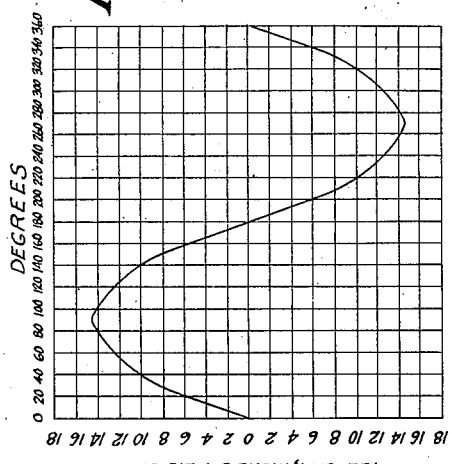
Inventor
Charles N. Bebinger
By Frease and Bishop
Attorneys Patented Mar. 4, 1941

2,234,071

UNITED STATES PATENT OFFICE 2,234,071

LOADING APPARATUS

Charles N. Bebinger, New Philadelphia, Ohio, assignor to La-Del Conveyor & Manufacturing Company, New Philadelphia, Ohio, a corporation of Ohio Application September 30, 1939, Serial No. 297,355

17 Claims. (Cl. 198—14)

The invention relates generally to material loading apparatus, and more particularly to loading machines adapted for gathering and loading coal in a mine.

A principal object of the present invention is to provide an improved loading machine having novel gathering or pick up mechanism which will gather and elevate frangible material without breaking or crushing the same, and which is particularly adapted for handling soft bituminous coal in the form of coarse and fine aggregate, as mined.

Another principal object is to provide an improved ambulatory loading machine consisting essentially of only two conveying elements, namely, a vibratory conveyor for gathering and elevating material and especially adapted for picking up coal as shot down in a mine, and a discharging conveyor boom for receiving coal from the vibratory conveyor; said boom having a discharge range of 180° or more for maintaining a discharge point over a receiving medium, such as a mine car or transporting conveyor, while the loading machine moves or progresses as a unit through mine props or confined spaces.

The loading machine comprising the present invention accomplishes the foregoing principal objects and also enables the attainment of numerous other novel and beneficial desiderata constituting the basis for other important objects of the present invention, some of which are hereinafter set forth.

Stated in another way, the improved loading machine which I have invented primarily for accomplishing the foregoing principal objects is particularly adaptable to a construction which includes among its advantages comparative simplicity mechanically with relatively few operating parts, compactness, greatly reduced weight and low manufacturing cost.

A further and important object of the present invention is to provide an improved loading machine which embodies a quickly detachable discharging conveyor boom, thus producing a loading machine of substantially universal use under varying mine conditions and requirements.

Prior to my invention, certain loading machines of which I am aware have embodied powerfully driven positive acting gathering mechanisms for picking up coal in quantity from large piles, and usually consisting of vanes or arms which are forced through a substantial depth of the coal pile. These positive gathering mechanisms inevitably cause excessive rubbing, crumbling, crushing and breaking up of the coal.

The action of the vibratory gathering mechanism embodied in the present invention is in sharp contrast to the crushing action of these prior mechanisms. My improved vibratory gathering conveyor is not forced through a substantial depth of coal; instead it picks away at the edge of the pile, gently but incessantly, somewhat akin to a shoveling action, yet rapidly so as to gradually and constantly gather and convey a substantial quantity of coal without breakage.

Moreover, the action of the present improved gathering mechanism not only gathers the coal without breakage, but also elevates and conveys the coal, whereas these prior positive acting gathering mechanisms require separate or additional conveying mechanism for elevating coal received from the gathering mechanism.

Accordingly, the embodiment of the present improved gathering mechanism makes for simplicity in a loading machine because it eliminates the need for additional elevating and conveying mechanism because it omits positive gathering mechanism; because it greatly reduces the number and weight of power transmitting parts required; and because it effects a great saving in power consumption, not only with respect to driving the gathering mechanism, but in motivating the machine itself.

Thus the bulk and weight of the present loading machine is greatly reduced as compared with these prior loading machines, and the present machine is therefore practicable for loading coal in low vein mines, whereas the necessary weight and bulk of these prior loading machines, and particularly their required height, substantially prohibits their use in low vein coal mines.

In addition to the disadvantages heretofore mentioned, these prior loading machines with positive gathering mechanisms present many further difficulties due to their ponderous bulk and weight, including excessive labor and expense involved in transporting the machines into a mine, the complexity of assembling, disassembling and repairing operations, and the high maintenance cost.

Reciprocating or shaker conveyors with self-loading shovels or troughs have been proposed for loading coal, but these have many limitations and are objectionable primarily because the conveyor driving mechanism must be securely anchored in place, thus precluding the portable mounting which is essential to the successful operation of a loading machine.

Such reciprocating conveyors require a differential stroke of not less than 4 inches and usually 4 to 6 inches with an operating speed of 60 to 90 strokes per minute in order to obtain proper conveying action, and if the driving mechanism is not fixed or anchored, the proper conveying action cannot be obtained.

Other limitations of reciprocating conveyors with self-loading shovels include the fact that the self-loading shovel operates to elevate the coal only a very slight amount, and the fact that complicated driving connections are required to produce a differential stroke which will convey coal.

The present invention employs a vibratory gathering and elevating conveyor operating preferably with a uniform stroke of such short travel and high speed as to make practicable a portable or ambulatory mounting for the loading machine without detracting from its conveying action.

Some of the specific objects which are fulfilled by the present invention may be enumerated as follows:

The provision of an improved mobile loading machine having a vibratory gathering conveyor operating with a uniform stroke in both directions for gathering and elevating coal without breakage.

The provision of a loading machine having a vibratory gathering conveyor and a discharging conveyor with improved single driving means for both conveyors.

The provision of a loading machine having a vibratory gathering conveyor and a discharging conveyor, and conveyor driving means bodily movable with the gathering conveyor as a unit.

The provision of a loading machine having a vibratory gathering conveyor with an improved material carrying surface for increasing the conveying action.

The provision of a mobile loading machine having a gathering conveyor which is easily detachable as a unit either with or without the driving mechanism therefor.

The provision of a loading machine having a vibratory gathering conveyor, the speed of which is controllable to effectively control the volume of coal conveyed thereby for conforming to the capacity of the transporting medium receiving coal from the loading machine.

The provision of a mobile loading machine with a minimum number of power units arranged symmetrically and longitudinally of the machine to produce a machine of minimum overall width.

The foregoing principal and specific objects, and others which will become apparent from the following description, are accomplished by the loading machine comprising the present invention, which is embodied in a simple and inexpensive ambulatory loading machine with greatly reduced weight, bulk, and operating and maintenance cost as compared with all prior loading machines.

A preferred embodiment of the invention is illustrated by way of example in the accompany drawings and hereinafter described in detail, and the various elements, combinations and sub-combinations which attain the objects of the invention are defined in the appended claims.

Referring to the drawings forming part hereof,

Fig. 2a is a plan view of the rear portion of the machine shown in elevation in Fig. 1a, parts being broken away;

Fig. 3 is a fragmentary sectional longitudinal view of the discharging conveyor as on line 3—3, Fig. 2a;

Fig. 4 is a transverse sectional view as on line 4—4, Fig. 2a;

Fig. 5 is a transverse sectional view as on line 5—5, Fig. 2a;

Fig. 8 is a fragmentary longitudinal sectional view substantially on line 8—8, of Figs. 2 and 2a;

Fig. 9 is a similar view taken on the longitudinal center line of the machine;

Fig. 10 is a fragmentary plan view with part of the gathering conveyor removed and parts broken away and in section;

Fig. 11 is a fragmentary sectional view of the eccentric connection between the pitman arm driving the gathering conveyor and the driving mechanism;

Fig. 12 is a fragmentary sectional view as on line 12—12, Fig. 10;

Fig. 18 is a fragmentary elevational view of the improved loading machine equipped with a different type of discharging conveyor;

Fig. 19 is a diagrammatic view showing the motion of the vibratory conveyor; and Fig. 20 is a graph indicating the velocity of the gathering conveyor at different stages throughout a complete stroke.

Similar numerals refer to similar parts throughout the several views of the drawings.

Figure 6:
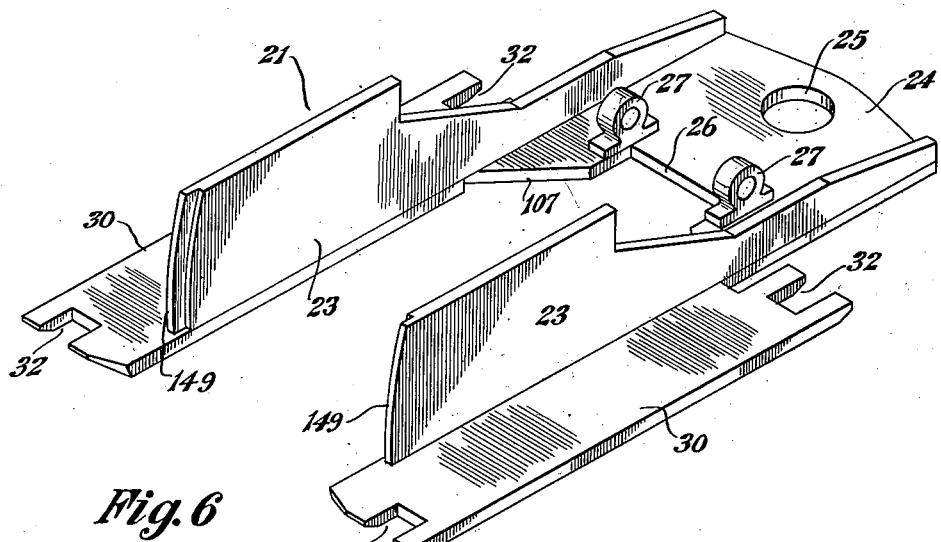
Fig. 6 is a detached perspective view of the main base frame for supporting the loading machine on crawlers.

The improved loading machine is entirely supported on a U-shaped main base frame indicated generally at 21 in Fig. 6, and the frame 21 is carried on crawlers indicated generally at 22 at opposite sides of the frame for mounting the machine for ambulatory movement.

The frame 21 includes upright side plates 23 having their rear end portions connected together by a transverse web plate 24 which may be welded to the bottom edges of the side plates 23. This web plate is preferably provided with an opening 25 on the longitudinal center line of the frame, and the mounting means for the discharging conveyor is adapted to be mounted in and over this opening. The forward edge of the web plate 24 has a cut out portion 26 at opposite sides of which are mounted suitable bearing blocks 27 for journaling the transverse pivot sleeve 28 of the U-shaped super-frame indicated generally at 29 in Fig. 7, for tiltably mounting the super frame on the main frame.

Figures 1, 1A:
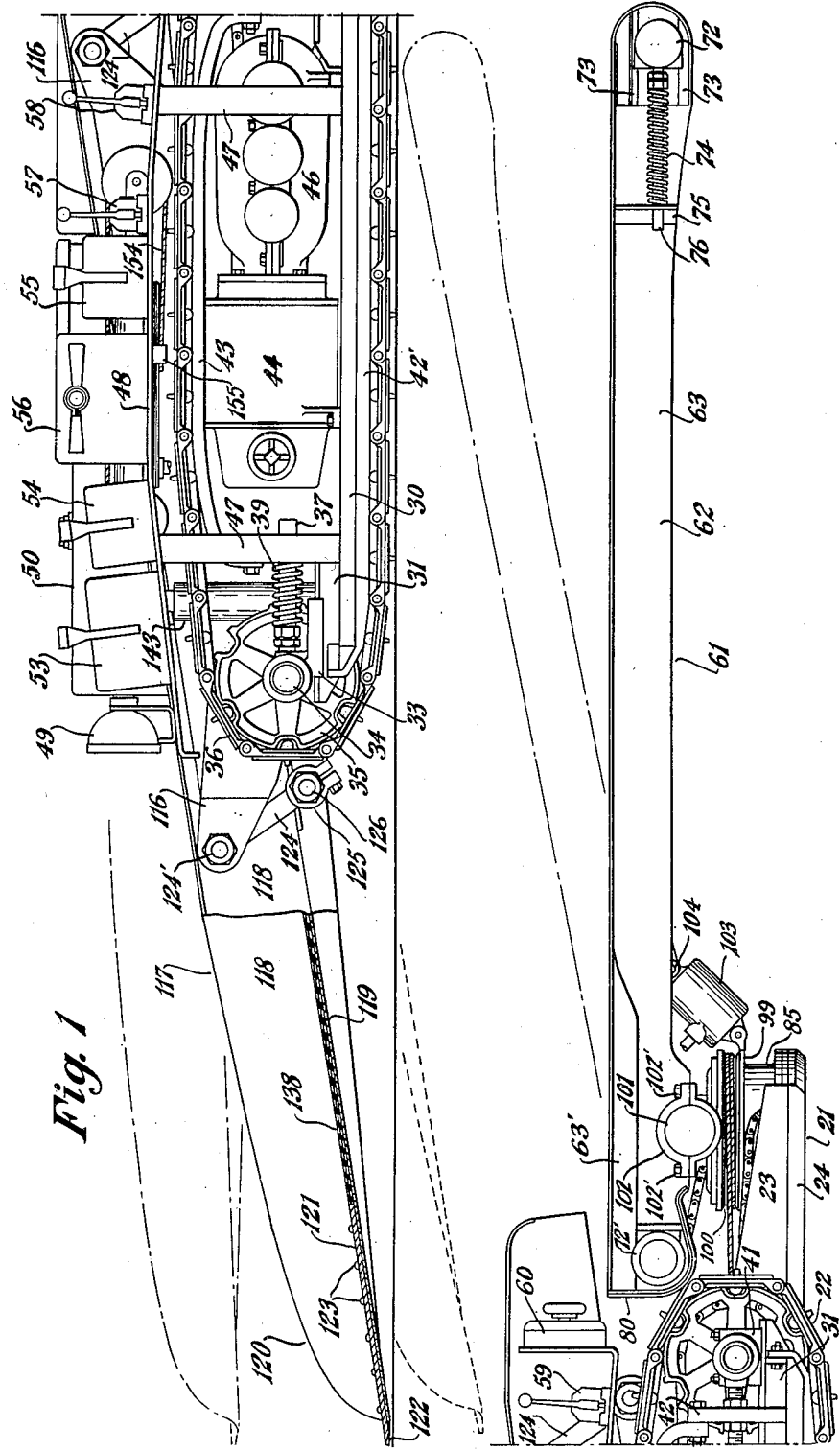
Figure 1 is a side elevation of the front portion of a preferred embodiment of the improved loading machine.
Fig. 1a is a side elevation of the rear portion of the machine, Figs. 1 and 1a constituting a side elevation of the complete machine.
Figure 13:
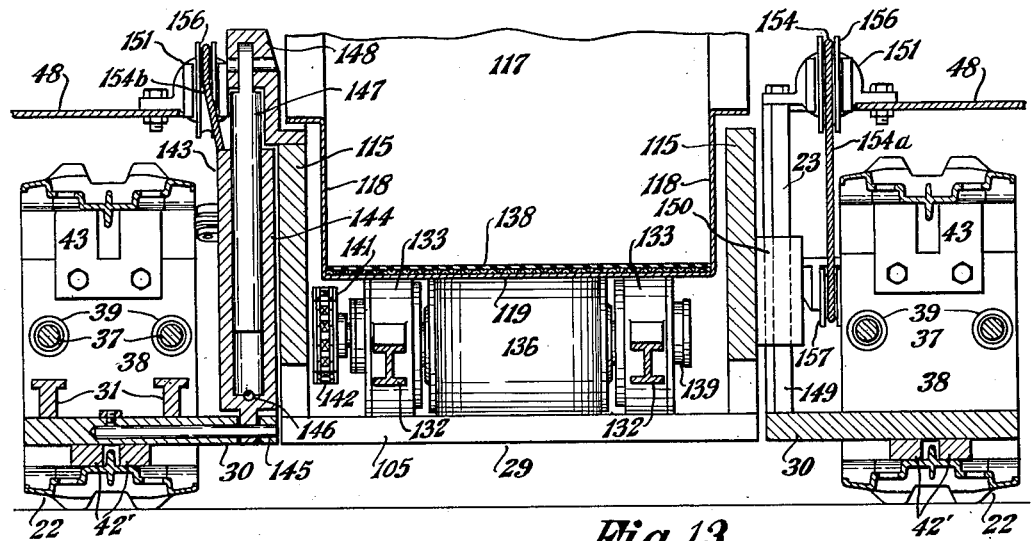
Fig. 13 is a transverse sectional view taken substantially on line 13—13, Fig. 10.

The forward end portions of the main frame side plates 23 have crawler supporting plates 30 secured to their bottom edges as by welding, and projecting laterally outwardly from the side plates. As best shown in Figs. 1, 1a and 13 these plates 30 support bearing guides 31 at each end which carry bearing blocks for the crawler sprockets and the bearing blocks are located at laterally opposite sides of the cut-out portions 32 as best shown in Fig. 6. The guides 31 at the forward ends of the plates 30 carry bearing blocks 33 which journal the shafts 34 of the forward idler sprockets 35 and the rim portions of the sprockets pass through the cut-out portions 32 at the forward ends of the crawler supporting plates 30.

Means for yieldably and adjustably urging the sprockets 35 forwardly against the crawler tread 36 engaged thereby preferably includes rods 37 secured at their forward ends to the bearing blocks 33 and their other ends passing through upright plate members 38 secured on the plates 30. Springs 39 encircle the rods 37 and are interposed between nuts on the rods and the upright members 38 to resiliently urge the bearing blocks forwardly.

The crawler sprockets 40 at the other ends of the crawler supporting plates 30 are the drive sprockets for the crawler treads 36. These sprockets 40 are journaled in bearing blocks 41 supported on the guides 31 and rigidly connected to upright bars 42 secured to the plates 30. The bearing blocks 41 are located at the sides of the cut-out portions 32 at the rear end of plates 30 so that the rims of the sprockets 40 pass through the cut-out portions 32.

The crawler treads 36 engaged by the drive sprockets 40 and the idler sprockets 35, and the sprockets themselves, are of well known design and form no part of the present invention. Guide means for the crawler treads preferably includes bars 42' secured to the under side of the plates 30, and guides 43 for the upper run of the treads bent downward and secured at their ends to the upright members 38 and 42 respectively, as best shown in Figs. 1 and 1a.

Each crawler 22 has its own power drive mechanism in longitudinal alignment with the crawler and supported on the plate 30. Each crawler drive preferably includes a motor 44 which drives a sprocket 45 through a conventional gear reduction box 46. The sprocket 45 is operatively connected by a chain 45' to a sprocket 46a on the crawler sprocket shaft 40' for driving the crawler sprocket 40.

Figure 2:
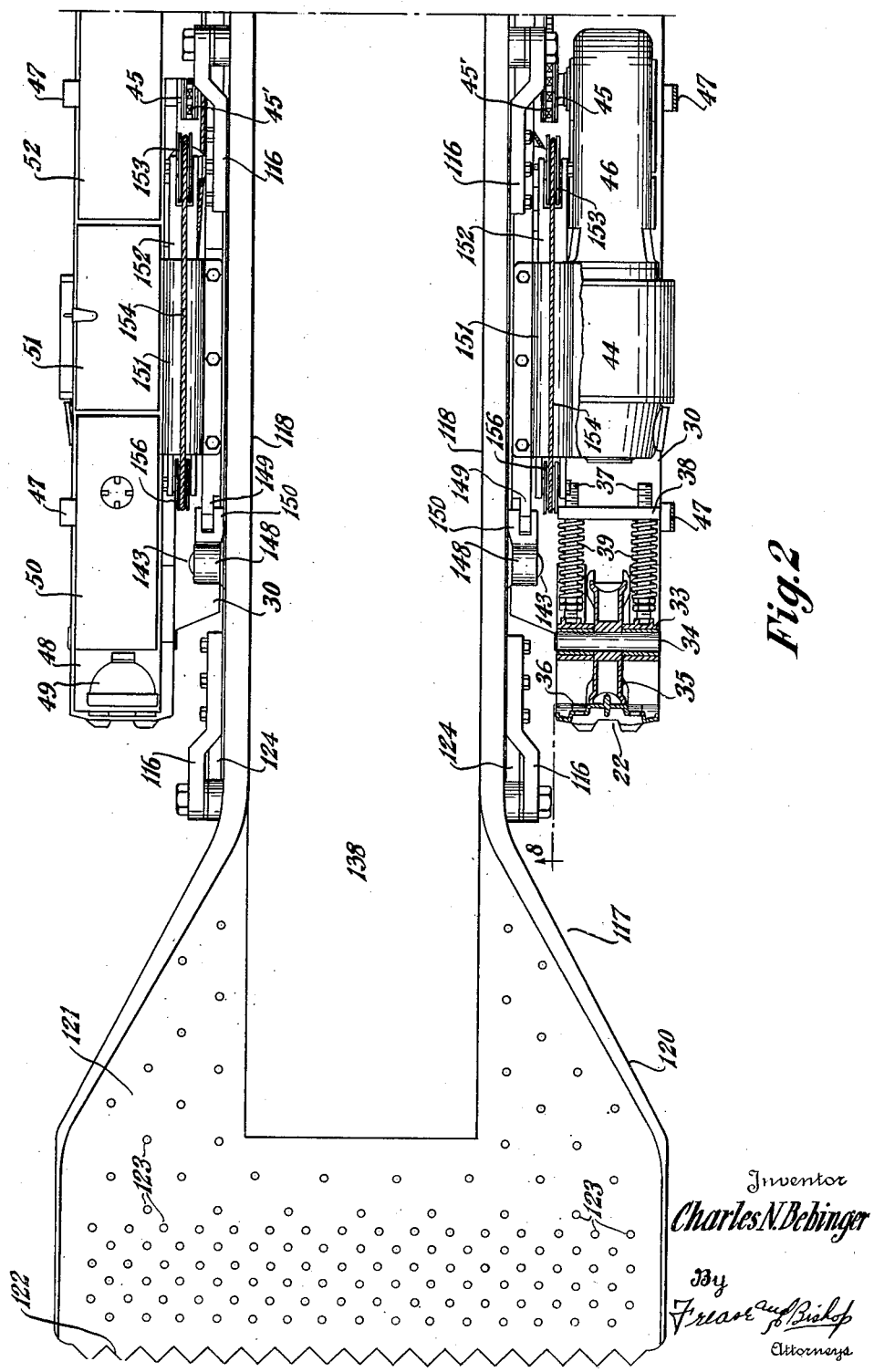
Fig. 2 is a plan view of the front portion of the machine shown in side elevation in Fig. 1, parts being broken away and parts in section.

Preferably exterior side bars 47 are secured at their lower ends to the plate 30 and extend upwardly at the outside of the crawlers for supporting at their upper ends fender plates 48 overlying the crawlers. Headlights 49 may be conveniently mounted at the forward ends of these fenders and one fender may be conveniently used to carry the various controls for operating the loading machine as indicated in Fig. 1, while the other fender may be conveniently utilized for carrying other appurtenances. As shown in Fig. 2 one fender may carry an oil sump 50 for the hydraulic system, a tool box 51, and a resistance 52 required for the crawler motors.

As indicated in Figs. 1 and 1a the other crawler fender 48 may carry the starter 53 for the motor which drives the conveyors, the separate reverse controls 54 and 55 for the crawler motors, a double rheostat 56 for both crawler motors, a hydraulic control valve 57 for raising and lowering the gathering conveyor, a hydraulic control valve 58 for swinging the discharge conveyor boom, a hydraulic control valve 59 for raising and lowering the discharge boom, and a field resistance 60 for controlling the speed of the motor which drives the conveyors.

As shown in the drawings the discharging conveyor boom 61 is mounted at its receiving end in the opening 25 of the web 24 for tilting movement vertically upward as indicated in dot-dash lines in Fig. 1a, and for horizontal swinging over a range of 180° or more as indicated by the dot-dash lines in Fig. 2a.

This type of discharge conveyor boom is shown by way of example, but the invention comprehends the use of other types of discharging conveyors such as shown in Fig. 18 in which the discharging conveyor 61a embodies an inclined trough 62a for elevating material to a discharge point sufficiently high for discharging into mine cars. The discharging conveyor boom may also be one in which the receiving end is fixed or rigidly mounted on the main frame 21 and the conveyor is provided with flexing means between its receiving end and discharge end to permit varying the position of the discharge end without changing the position of the receiving end.

As shown the conveyor 61 includes a trough 62 made up of angular side plates 63 the bottom flanges 64 of which support the lower runs 65 of a chain conveyor. A plate 66 extends between intermediate portions of the side plates 63 for supporting the upper runs 67 of the conveyor chain. Flight bars 68 are secured at longitudinal intervals to extend transversely between the conveyor chains for conveying material along the trough to the discharge end of the conveyor boom.

The idler sprockets 69 for the conveyor chain are located at the discharge end of the conveyor boom and are fixed on a shaft 70 preferably journaled at its outer ends in anti-friction bearings 71 which are mounted in bearing blocks 72. The bearing blocks are slidably mounted on guides 73 secured to the exterior of the side plates 63 as best shown in Fig. 5, and the bearing blocks are yieldably and adjustably urged toward the discharging end of the conveyor by springs 74 interposed between the bearing blocks and angle plates 75 fixed on the side plates 63. Spring centering rods 76 are secured at one end to the bearing block 72 and their other ends pass through the angle plates 75.

Preferably the idler shaft 70 is engirdled by a floating sleeve 77 (Figs. 3 and 5) between the idler sprockets 69, for supporting a transverse extension plate 78 when the idler sprockets are adjusted. The rearward end of the extension plate 78 rests on the sleeve 77 and the forward end underlies the rear edge of the transverse plate 66 and is slidably supported on a cross bar 79, as shown in Fig. 3.

Figure 16:
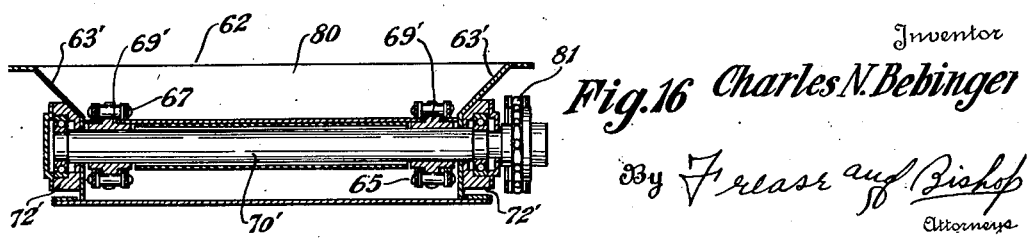
Fig. 16 is a fragmentary sectional view as on line 16—16, Fig. 8.

At the receiving end of the discharging conveyor boom, the angle side plates 63 are preferably outwardly flared at their upper portions as shown at 63' in Figs. 2a and 16 and connected across their front ends by a transverse end closing member portion 80 to form a hopper portion for receiving material from a gathering conveyor. The drive sprockets 69' for the chains are secured on a drive shaft 70' journaled in anti-friction bearing blocks 72' secured to the side plates 63', and one end of the shaft 70' projects outwardly and carries the driven sprocket 81.

The mounting means for mounting the receiving end of the discharging conveyor boom on the main frame preferably includes a bottom plate 82 supported on the web 24 of the frame and having a central depressed portion 83 for providing an end bearing for a vertical shaft 84. An annular housing member 85 is secured to the bottom plate 82 concentric with the shaft 84, and the closed upper surface of the housing is provided with an annular groove or raceway for carrying anti-friction elements such as balls 86.

Means for rotatably mounting the discharging conveyor boom on the annular housing 85 for horizontal swinging movement preferably includes a housing member indicated at 87 having an annular raceway formed in its lower wall for receiving the balls 86, and adapted to house a drive shaft 88 which has a drive sprocket 89 on its projecting end operatively connected to the sprocket 81 by means of a chain 90. The shaft 88 is preferably journaled in anti-friction bearings 91 and 92 located within the housing 87, and has thereon a bevel gear 93 meshed with a bevel gear 94 on the top end of shaft 84.

Figures 14, 15:
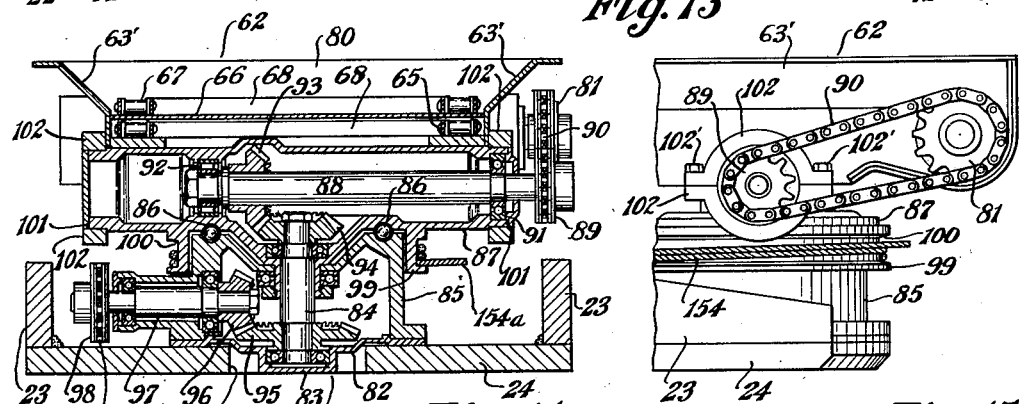
Fig. 14 is a transverse sectional view as on line 14—14, Fig. 10.
Fig. 15 is a fragmentary side elevation of the parts shown in section in Fig. 14.
Figure 17:
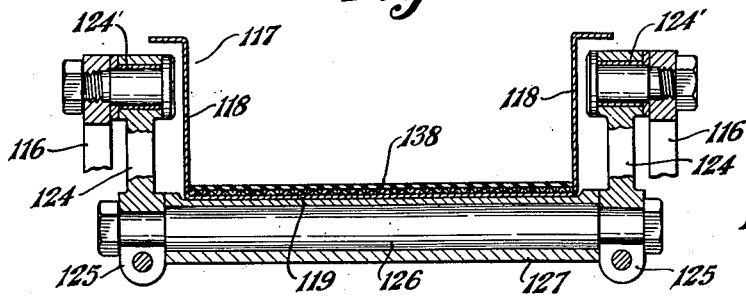
Fig. 17 is a fragmentary transverse sectional view as on line 17—17, Fig. 8.

The driving connections for transmitting the drive from the main power unit to the discharging conveyor further include a bevel gear 95 on the lower end of shaft 84 meshing with a bevel gear 96 on a horizontal shaft 97 which projects into the housing 85 and has a driven sprocket 98 on its outer end. The shafts 84 and 97 may be suitably journaled in anti-friction bearings as clearly shown in Fig. 14.

Preferably the movable housing 87 has a depending annular flange portion 99 which telescopes over the upper end of the fixed housing 85 and a cable groove 100 is formed in the exterior of the flange portion 99 for a purpose to be described. The movable housing 87 is provided at laterally opposite sides with projecting boss portions 101 located on a horizontal axis intersecting the vertical axis of the mounting means, which is also the axis of shaft 84. Yoke members 102, the upper parts of which are secured as by welding to the exteriors of the side members 63', are preferably clamped around the boss portions 101 by bolts 102' for journaling said discharge conveyor on said boss portions, so that the discharging conveyor boom can be tilted about the boss portions as a center in the manner indicated in dot-dash lines in Fig. 1a.

Thus by merely removing the four bolts 102', disconnecting the jack 103 and slipping the chain 90 from one of the sprockets 89 and 81, the entire discharging conveyor boom may be detached and another size or type of conveyor substituted in a very few minutes, without affecting the remaining drive connections.

Means for tilting the discharging conveyor boom 61 preferably includes the hydraulic jack consisting of a cylinder 103 pivotally connected to the flange portion 99 of the movable housing member 87, and a piston operable in said cylinder by hydraulic pressure and pivotally connected to the under side of the boom as indicated at 104.

Figure 7:
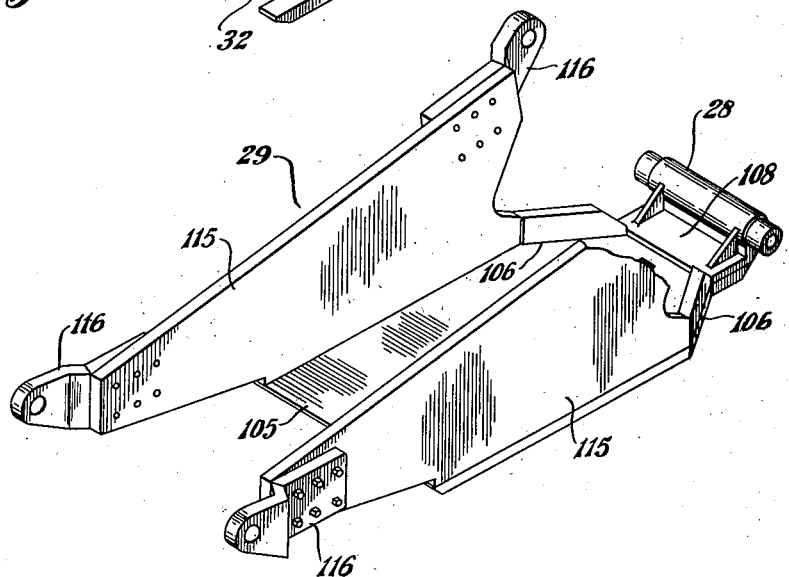
Fig. 7 is a detached perspective view of the super-frame which carries the vibratory gathering conveyor.

The improved gathering and elevating conveyor and the power driving mechanism therefor are mounted as a unit on the U-shaped super-frame indicated generally at 29 and shown in detached perspective in Fig. 7. The super-frame 29 has a bottom plate 105 which is tapered inwardly at its rearward end as shown at 106 to fit within the tapered sides 107 of the cut-out portion 26 in the web 24 of the main frame. The bottom plate 105 is provided at its rearward end with an extension 108 on the end of which is secured the transverse pivot sleeve 28 which is journaled in the bearing blocks 27 on the main frame.

As best shown in Fig. 12 a sprocket shaft 109 is journaled within the sleeve 28 by means of anti-friction bearings 110 having a spacer sleeve 111 therebetween, and the projecting ends of shaft 109 have secured thereon chain drive sprockets 112 and 113. The sprocket 112 is operatively connected by a chain 114 to the sprocket 98 on the shaft 97 for transmitting the drive through the mounting members 85 and 87 to the discharging conveyor, and the sprocket 113 is adapted to be driven by the main power drive unit carried on the super-frame.

The super-frame 29 preferably includes side plates 115 secured as by welding at their bottom ends to the transverse bottom plate 105, and the opposite ends of the side plates preferably have angle brackets 116 secured thereon for connection with the sides of the gathering and elevating conveyor trough.

Thus the super-frame and the power drive and gathering conveyor carried thereby are tiltable as a unit with respect to the main frame 21 about the pivot shaft 28 journaled in the bearing blocks 27.

The vibratory gathering and elevating conveyor indicated generally at 117 preferably includes a trough having side plates 118 and a transverse bottom plate 119. Preferably at the forward end portion of the conveyor trough the side plates 118 are outwardly divergent to form an enlarged gathering head indicated at 120, the bottom wall 121 of which has a serrated forward edge 122 for cutting through coal which may be stuck to the mine floor, and an upper surface provided with a large number of rivet heads indicated at 123 providing a roughened material carrying surface for aiding in loosening and pulling coal from a pile.

The gathering conveyor trough 117 is operatively mounted in inclined position for vibratory or oscillatory movement on the brackets 116 of the super-frame, the super-frame being preferably constructed to mount the trough 117 at an inclination of substantially 9° to the horizontal. Preferably forward and rearward hanger arms 124 are pivoted at their upper ends to the brackets 116 at 124' and depend therefrom at an angle preferably approximating 55° to the horizontal. The lower ends of these hanger arms 124 are provided with yokes 125.

The forward yokes 125 are clamped around the ends of a transverse connector shaft 126 journaled in a sleeve member 127 secured to the bottom wall 119 of the gathering conveyor trough. The rearward yokes 125 are similarly clamped around a transverse shaft 128 journaled in a sleeve member 125 secured to the bottom wall 119 of the rearward end portion of the conveyor trough. Preferably the effective length of each hanger arm 124, that is, the distance from the pivot 124' to the center of the transverse connector shaft 126 or 128 is approximately eight inches.

The sleeve member 127 is provided with rearwardly extending vertical flanges or ears 129, as best shown in Figs. 8, 9 and 10, which carry a transverse shaft 130 on which the forward ends 131 of the pitman or connecting rods 132 are journaled for transmitting vibratory motion from the power unit to the gathering conveyor 117.

Preferably the rear ends of the pitman rods 132 are provided with eccentric rings 133 which are journaled by means of anti-friction bearings 134 on eccentric shafts 135, as shown in detail in Fig. 11. The eccentric shafts 135 project laterally outward from a conventional gear box 136 and are arranged to be driven through reduction gearing in the gear box in a usual manner by a main driving motor 137 which is supported on the superframe 29 and positioned on the longitudinal axis of the loading machine.

The motor 137 and the reduction gearing in the box 136 are arranged in well known manner to drive the eccentric shaft at speeds of from 400 R. P. M. to 570 R. P. M. and preferably at a speed of substantially 480 R. P. M. The eccentric shafts 135 are preferably off center a distance of about one-fourth inch so as to give the pitman arms a total stroke of substantially one-half inch, herein termed "short stroke."

The operating speed of the eccentric shafts, the length of stroke of the pitman arms 132, the length and angle of inclination of the hanger arms 124 and the angle of inclination of the conveyor trough 117 are all coordinated so that the vibratory or oscillatory movement of the trough when driven by the pitman rods 132 is such as to gather and convey upwardly soft lump coal aggregate as mined without any material breakage. The trough oscillates in a curvilinear path about the pivots 124' at the upper ends of the hanger arms, and the length of said arms determines the radius of the curvilinear path while the angle of the hanger arms with the horizontal determines the disposition of said path.

As shown in Figs. 1, 2, 13 and 17 the upper surface of the major part of the gathering trough 120 is provided with a resilient lagging material 138 which is preferably rubber belting or the like. This resilient material greatly improves the conveyor action of the gathering trough, particularly in the case of the larger lumps of coal, due to the high coefficient of friction of the rubber belting and because its resiliency aids greatly in preventing the lumps from breaking up or rolling back down the incline of the trough.

Preferably, the resilient material 138 covers the entire upper surface of the transverse bottom plate 119 throughout the narrow portion of the trough and extends a substantial distance into the gathering head portion 118 so that as the serrated edge 122 of the head cuts under the coal and gathers or pulls away coal from a pile, the roughened upper surface of the gathering head needs to move the coal only a very short distance before it is engaged and conveyed by the resilient surface. The roughened metal surface at the forward end of the gathering head protects the resilient material 138 from wear due to falling coal, and also tends to prevent choking of the coal at the narrow portion of the trough because the conveying speed is less than that of the resilient material.

Referring to Figs. 9 and 10, the main driving motor 137 is arranged to drive a hydraulic pump 139 which projects from one side of the gear box 136 and is operatively connected to the motor in a usual manner through reduction gearing in said box. Preferably the pump 139 is connected by suitable piping to the oil sump or reservoir 50 for maintaining a constant pressure in said reservoir.

Laterally opposite to the pump 139 a sprocket drive 140 projects from the gear box 136, being likewise driven by the motor 137 through reduction gearing in the gear box 136. A driving sprocket 141 is mounted on the outer end of the drive 140 and operatively connected by a chain 142 to the sprocket 113 on the pivot shaft 109 for transmitting the drive through sprockets 112 and 98 to the discharging conveyor 62.

Means for raising and lowering the gathering and elevating conveyor 117 to the dot-dash line and dotted line positions indicated in Fig. 1, preferably comprises a pair of vertically disposed hydraulic jacks indicated generally at 143, and shown in plan elevation in Fig. 10, in side elevation in Fig. 8, and in section in Fig. 13. The jacks 143 are located at opposite sides of the super-frame 29 and include vertically disposed cylinders 144 pivoted at their bottom ends to pivot shafts 145 secured in the crawler supporting plates 30, as shown in Fig. 13.

The lower ends of the cylinders 144 communicate by means of suitable piping 146 with the hydraulic reservoir 50 to admit pressure fluid into the cylinders for raising the plungers 147 therein. The upper ends of the plungers 147 are pivotally connected to brackets 148 mounted on top of the super-frame 29. The hydraulic control valve 57 shown in Fig. 1 is of conventional design and is connected in the pipe line from the reservoir to the jacks to control the raising and lowering of the super-frame 29 and the gathering and elevating conveyor carried thereon.

Preferably the forward ends 149 of the main frame side plates are rabbeted and arcuately curved about the pivot shaft 28 as a center, as best shown in Figs. 6 and 8, and guide bars 150, which are U-shaped in cross section, are secured to the super-frame side plates 115 for slidably fitting around the rabbeted ends 149 to guide the super-frame as it is raised or lowered relative to the main frame.

Means for swinging the discharging conveyor boom horizontally over a range of 180° or more, preferably includes a pair of horizontally disposed jacks 151 similar in construction to jacks 143 and mounted on opposite sides of the main frame. The jacks 151 may be secured to the top ends of the main frame side plates 123 as shown in Fig. 10, and their plungers 152 carry sheaves 153 at their outer ends.

Hydraulic pressure fluid is admitted into the jack cylinders from the reservoir 50 by suitable piping for forcing the plungers outwardly, and the two end portions of a cable 154 are wound around sheaves 153, the ends of the cable being secured to the under sides of the jacks, as shown at 155 in Fig. 8. The cable end portions 154 are then led back around sheaves 156 mounted on the opposite ends of the jack cylinders and thence to the rotatable housing member 87 carrying the discharging conveyor boom 61, so that any movement of the jack plungers 152 produces twice as much movement in the cable portions or strands leading to the housing member 87.

As shown in Figs. 8 and 10, the cable strand 154a from one of the jacks 151 passes around suitable sheaves 157 and 158 on one main frame side plate 23 and wraps around the cable groove 100 of housing member 87 in one direction; and the cable strand 154b from the other jack 151 passes around suitable sheaves 159 and 160 on the other main frame side plate 23 and wraps around the cable groove 100 in the other direction.

The hydraulic control valve 58 is a four way valve of conventional design connected to the pipe lines leading from the reservoir 50 to the jacks 151 and is arranged to admit fluid to one jack cylinder and simultaneously exhaust fluid from the other jack cylinder for selectively swinging the discharging conveyor boom in either direction.

The jack which includes cylinder 103 for raising and lowering the discharge conveyor boom 61 is independently operated by the hydraulic control valve 59 which is connected to a suitable pipe line leading from the reservoir 50 to the jack cylinder 103.

In the operation of the improved loading machine comprising the present invention, the crawlers are operated and manipulated to move the machine to any desired location in a mine, the separate reverse controls 54 and 55 being utilized for selectively operating the crawler motors to turn the machine in any desired direction. The longitudinal disposition of the crawler motors 44 and the main motor 137 with respect to the loading machine provides for a minimum overall width of the loading machine, enabling it to pass through narrow spaces in a mine, as between mine props, and the novel gathering and elevating mechanism utilized in the present loading machine provides for a greatly reduced overall height of the machine, the maximum height of the machine illustrated being about 25 inches measured at the rear end of the gathering and elevating conveyor trough 117.

Thus the improved loading machine can be self-motivated to bring the forward end of the gathering trough 117 into engagement with the outer edge of a coal pile either at the mine face or any other desired location. The gathering and elevating conveyor is then tilted vertically upward or downward by means of the jacks 143 to position the serrated edge 122 of the gathering head substantially at the surface of the floor at the edge of the coal pile.

The starter 53 for main motor 137 is then operated to cause the trough 117 to vibrate or oscillate for gathering and elevating the coal from the pile to the top of the gathering trough 117 where it is discharged downwardly on the receiving end of the discharging conveyor boom. The conveyor boom 61 shown in Fig. 1a may be tilted upwardly as shown in Fig. 1a by means of the jack 103, or it may be swung horizontally as shown in Fig. 2a by means of the jacks 151 to position the discharge end of the discharging conveyor over the conveying medium which is utilized to convey the coal from the loading machine through the mine.

The vibratory action of the conveyor trough resulting from the coordination of the relatively high speed and short stroke reciprocating movement with the angle and disposition of the hanger arms produces a conveying and elevating movement which causes the coal to steadily move up the inclined trough without breakage, and such movement obviously produces so little reaction on the loading machine as a whole as to render it self-anchoring; that is, the short stroke of the trough being of uniform speed in both directions does not require the machine to be held or anchored against movement by means of jacks or the like when the trough is oscillated, as is the case when, for example, a shaker trough is utilized having a long differential stroke two to four times faster in one direction than in the other. In the diagrammatic representation of Fig. 19, the trough is shown at its lowest position in full lines and at its top position in dot-dash lines, and it will be seen that the trough follows a curvilinear path having a radius determined by the length of the hanger arms 124 oscillating about their upper pivots 124'.

A complete stroke or cycle of the conveyor trough may be described as follows: Starting at the lower full line position indicated in Fig. 19 the trough moves rearwardly and upwardly during the first quarter of the cycle represented by the 90° mark on Fig. 19 in which the circle S represents the path of the eccentric on the pitman rod 132. During this quarter cycle the velocity of the trough is gradually accelerated as the eccentric approaches the 90° mark, and a lump of material on the trough is carried rearward and upward due to the high coefficient of friction between the lump and the resilient surface; and the lump probably depresses or presses into the resilient material during this quarter cycle. The graph shown in Fig. 20 shows that the velocity of the trough or of a lump on the trough increases and accelerates to substantially 15 inches per second at the 90° point.

After the first quarter cycle is passed and the eccentric moves toward the 180° position the acceleration gradually decreases and probably somewhere between 90° and 180° the inertia of the lump causes it to leave the trough so that it becomes a freely falling body. After the second quarter cycle is passed the movement of the trough reverses and accelerates in the opposite direction up to 270° or three-quarters of the cycle so that the lump falls freely during this portion of the cycle, and probably is gradually engaged and picked up by the trough at a point somewhere near the completion of the cycle when the trough is slowing down and nearing the zero degree mark. The fact that the lump is thus reengaged by the trough at or near the completion of the stroke prevents any substantial jar or impact tending to break the lump, and the resilient lagging material contributes further to prevent any breakage of the material being conveyed.

It has been found that during a complete stroke the material moves up the trough a distance of about 1.1 inches which is probably due to the fact that the accelerated rearward stroke imparts sufficient momentum to the material to carry it rearward a slight distance in addition to the trough stroke while the material is freely falling during the forward stroke of the trough.

In any event, it has been found in actual practice that the improved vibratory gathering and elevating conveyor will rapidly and continuously gather and convey coal with substantially no breakage whatever even though the coal is in the form of a coarse and fine bituminous aggregate which is easily broken down.

Moreover, by utilizing the field resistance 60 to control the speed of the main driving motor 137, the speed of the gathering conveyor may be correspondingly controlled to nicely adjust the amount of coal delivered from the discharge end of the gathering conveyor to suit the capacity of various conveying media such as mine cars, belt conveyors and the like. Such a fine adjustment cannot be obtained satisfactorily where the gathering means includes positive arms or vanes which are forced through a coal pile and pull or drag in a substantial amount of coal regardless of the speed at which they are driven.

From the foregoing description it is apparent that a different type of discharging conveyor can be quickly and readily substituted for the conveyor boom 61 to suit the particular requirements of the conveyor to which the loading machine delivers material. Under certain conditions it may be desirable to dispense with the discharging conveyor and have the discharging end of the gathering conveyor deliver coal directly into a receiving medium. In this case the discharging conveyor would be entirely removed as previously described and the loading machine with its gathering and elevating conveyor would be operated as a unit.

The fact that the super-frame 29 carries the main driving motor and is pivoted for tilting with the gathering conveyor at a point located closely adjacent to the receiving end of the discharging conveyor provides for raising and lowering the gathering conveyor a considerable amount without materially changing the relative location of the discharging end of the gathering conveyor and the receiving end of the discharging conveyor regardless of the position of the discharging conveyor. In other words, referring to Fig. 9, the transverse pivot shaft 109 for the super-frame is located under the discharging end of the gathering conveyor and immediately adjacent the receiving end of the discharging conveyor boom.

The fact that the gathering and elevating mechanism comprises a vibratory conveyor trough which is driven with a uniform stroke in both directions by means of a simple eccentric and pitman arm connection eliminates the need for complicated driving mechanism and for heavy power transmitting parts otherwise required for forcing positive gathering means through the coal. The net result is a machine which is simple in mechanical design, having greatly reduced weight and bulk and involving a very low power consumption.

By mounting the gathering conveyor and the main power unit driving the conveyors on a super-frame which is pivotally mounted on the main frame, the clearances between the gathering trough and the driving mechanism remain constant enabling the provision of a loading machine of minimum height, and the angle of the pitman arms relative to the trough does not change when the trough is tilted.

Moreover, the improved construction and design of the present loading machine provides distinct manufacturing and installation advantages. The gathering conveyor can be assembled with the motor and super-frame in one place while the crawlers, main frame and discharging conveyor can be assembled in another place, and the assembly completed in the field. Where the machine is to be used in shaft type mines, it can be taken into the mine in three parts or units, namely, the discharging boom, the main frame and crawlers, and the super-frame with the gathering head and main driving mechanism attached.

The simplicity of the mechanical design of the machine renders the parts thereof readily accessible for repairs and provides for easily assembling or disassembling the machine or replacing unit parts thereof when the machine is in use in a mine. For example, the gathering trough 117 is quickly removed merely by detaching the four hanger arms 124, or the gathering trough and driving mechanism therefor may be detached as a unit with the super-frame 29 at the transverse pivot shaft 109. Also, if any part of the driving mechanism should fail, the same can be quickly and easily replaced in a short time.

Accordingly, the present improved loading machine is adapted for substantially universal use in coal mines under varying mining conditions, to gather and elevate and convey soft coal in the form of coarse and fine aggregate without substantial breakage, and provides a machine requiring only two conveying elements which is simple and inexpensive to construct, operate and maintain.

The term "uniform stroke" as applied herein to the vibratory or oscillatory gathering trough is intended to mean reciprocating trough movement over the same distance and with the same velocity and acceleration characteristics during the forward and reverse motions of the trough, and the term "short stroke" is intended to mean reciprocating trough movement of the order of substantially one-half inch in each direction.

I claim:

1. A loading machine for loading coal in a mine including a base, a discharging conveyor pivotally mounted at its receiving end on the base for vertical tilting movement and horizontal swinging movement, a uniform stroke oscillatory gathering conveyor unit pivotally mounted on the base for vertical tilting movement and including a trough having its delivery end positioned over and closely adjacent to the receiving end of the discharging conveyor, and a single power unit carried by the gathering conveyor unit under said trough for driving both conveyors.

2. A loading machine for loading coal in a mine including a base, a discharging conveyor having a mounting at one end on the base, and an inclined uniform stroke oscillatory gathering conveyor unit having a horizontal pivotal mounting on said base adjacent to the mounting for said discharging conveyor and having a trough, the delivery end of said trough being positioned over the receiving end of said discharging conveyor, and means carried by the gathering conveyor unit under said trough for oscillating said trough with a forward motion having the same velocity and acceleration characteristics as its reverse motion.

3. A loading machine for loading coal in a mine including a base, a discharging conveyor having a horizontal and vertical pivotal mounting on the base, an inclined uniform stroke oscillatory gathering conveyor unit having a horizontal pivotal mounting on said base adjacent to the pivotal mounting for said discharging conveyor, the delivery end of said gathering conveyor being positioned over the receiving end of said discharging conveyor, power means on the gathering conveyor unit below the gathering conveyor for driving the same, and means operatively connecting said power means to said discharging conveyor for driving the same.

4. A loading machine for loading coal in a mine including a base frame, a discharging conveyor mounted at one end on the base frame, a super-frame pivotally mounted for vertical movement on said base frame adjacent the discharging conveyor mounting, a power unit supported on said super-frame, a uniform stroke oscillatory gathering conveyor operatively supported on said super-frame above the power unit for delivering material onto said discharging conveyor, means operatively connecting said gathering conveyor to said power unit, and means operatively connecting said discharging conveyor to said power unit.

5. A loading machine including a base frame, a discharging conveyor having a pivotal mounting on said base frame, said pivotal mounting enclosing driving connections for said discharging conveyor, a super-frame tiltably mounted on a horizontal pivot supported on said base frame, a power drive on said super-frame, a uniform stroke oscillatory gathering conveyor operatively mounted on said super-frame and adapted to deliver material onto said discharging conveyor, a driving connection journaled on said horizontal pivot, and means operatively connecting said power drive and said discharging conveyor driving connections to said horizontal pivot driving connection.

6. A loading machine for loading coal in a mine including a base, a discharging conveyor mounted on the base, a uniform stroke oscillatory gathering conveyor unit having a trough and pivotally mounted on the base for vertical tilting and adapted to deliver material directly onto the receiving end of the discharging conveyor, a main power unit on said gathering conveyor unit operatively connected to both conveyors and disposed longitudinally of the base under said trough, a longitudinally extending crawler mounting for the base at each side thereof, and a crawler driving motor on the base within each crawler and in longitudinal alignment therewith.

7. In a power driven self-anchoring ambulatory loading apparatus, a frame, and an inclined conveyor trough mounted on said frame for uniform stroke oscillatory movement adapted to gather and convey soft coal aggregate upwardly along the trough, said trough having a resilient covering material aiding the conveying action.

8. In a power driven self-anchoring ambulatory loading apparatus, a frame, and an inclined conveyor trough mounted on said frame for uniform stroke oscillatory movement adapted to gather and convey soft coal aggregate upwardly along the trough, said trough having an enlarged gathering head provided with a roughened metal surface for gathering coal from a pile, and a resilient liner for the remainder of said trough for aiding the conveying action.

9. In a self-anchoring mobile loading machine for loading coal in a mine, a base frame, crawler means movably supporting the base frame, a super-frame, means mounting the super-frame on the base frame for vertical tilting movement relative thereto, means for adjusting said super-frame to tilted positions, a gathering and conveying trough, hanger arms operatively mounting said trough on said super-frame for uniform stroke oscillatory coal gathering and conveying movement, and means on said super-frame under the trough for oscillating said trough with a forward and reverse motion having the same velocity and acceleration characteristics.

10. A loading machine including a U-shaped frame having upright side plates and a transverse bottom plate, a U-shaped super-frame having upright side plates and a transverse bottom plate and fitting within the base frame, a gathering conveyor trough, hangers movably mounting said conveyor trough in inclined position on the side plates of said super-frame, power means on the bottom plate of said super-frame for imparting a uniform short stroke oscillatory motion to said conveyor trough, means pivotally mounting the super-frame at the discharge end of said trough on the bottom plate of said main frame for vertical swinging of said super-frame, guide means on the side plates of said super-frame slidably engaging the side plates of said base frame, and a discharging conveyor pivotally mounted at its receiving end on the bottom plate of said base frame adjacent said super-frame pivotal mounting for horizontal swinging of said discharging conveyor, whereby the receiving end of said discharging conveyor is positioned under the discharging end of said gathering conveyor at all times.

11. A loading machine including a U-shaped frame having upright side plates and a transverse bottom plate, a U-shaped super-frame having upright side plates and a transverse bottom plate and fitting within the base frame, a gathering conveyor trough, hangers movably mounting said conveyor trough in inclined position on the side plates of said super-frame, power means on the bottom plate of said super-frame for imparting a uniform short stroke oscillatory motion to said conveyor trough, means pivotally mounting the super-frame at the discharge end of said trough on the bottom plate of said main frame for vertical swinging of said super-frame, a discharging conveyor mounted at its receiving end on the bottom plate of said base frame with said receiving end extending under the discharge end of said gathering conveyor trough, guide means on the side plates of said super-frame slidably engaging the side plates of said base frame, and means operatively connecting said power means to the discharging conveyor for driving the same.

12. A loading machine including a U-shaped base frame having upright side plates and a bottom plate connecting the same, a U-shaped super-frame having upright side plates and a bottom plate connecting the same and fitting within said base frame, a gathering conveyor trough, hangers movably mounting said conveyor trough in inclined position on the side plates of said super-frame, power means on the bottom plate of said super-frame for imparting a uniform short stroke oscillatory motion to said conveyor trough, means pivotally mounting said super-frame at the discharge end of said conveyor trough on the bottom plate of said main frame for vertical swinging of said super-frame, and guide means on the side plates of said super-frame slidably engaging the side plates of said base frame.

13. A loading machine including a base frame having upright side members, a super-frame having upright side members and fitting within said base frame, a gathering conveyor trough, hangers oscillatably mounting said conveyor trough in inclined position on the side members of said super-frame, means for driving said conveyor trough with a forward and rearward stroke having the same velocity and acceleration characteristics, means pivotally mounting said super-frame on the base frame at the conveyor trough discharge end for vertical swinging of said super-frame, guides on the upright members of said base frame and super-frame slidably engaging each other, and a discharging conveyor pivotally mounted on the base frame adjacent the pivotal mounting of the super-frame for permitting horizontal swinging of the discharging conveyor while maintaining its receiving end under the discharging end of said gathering conveyor.

14. A loading machine including a base frame having upright side members, a super-frame having upright side members and fitting within said base frame, a gathering conveyor trough, hangers oscillatably mounting said conveyor trough in inclined position on the side members of said super-frame, means for driving said conveyor trough with a forward and rearward stroke having the same velocity and acceleration characteristics, means pivotally mounting said super-frame on the base frame at the conveyor trough discharge end for vertical swinging of said super-frame, and guides on the upright members of said base frame and super-frame slidably engaging each other.

15. A power driven self-anchoring ambulatory loading apparatus for loading coal in a mine having mobile mounting means, a base frame supported on said mobile mounting means, a super-frame movably mounted on said base frame, interengaging guide means on said main frame and said super-frame for permitting relative movement therebetween, a uniform short stroke oscillatory conveyor operatively mounted on said super-frame for gathering and elevating coal, and conveyor driving means mounted on said super-frame underneath said conveyor and operatively connected thereto.

16. A power driven self-anchoring ambulatory loading apparatus including a base frame having upright side members and a bottom plate extending therebetween, crawler supporting plates secured to and extending outwardly from said side members, crawlers carried on said supporting plates for movably mounting said base frame, a super-frame having upright side members and located within the upright members of said base frame, a gathering conveyor trough mounted on the upright side members of said super-frame for uniform short stroke oscillatory movement, means pivotally mounting the discharge end of said super-frame on the bottom plate of said base frame, and interengaging guide means on the side members of said base frame and said super-frame.

17. A self-anchoring mobile loading machine including a base frame, a U-shaped super-frame having upright sides, an inclined gathering and conveying trough, means operatively mounting said trough on said upright sides for uniform short stroke oscillatory coal gathering and conveying movement, means pivotally mounting the discharge end of said super-frame on said base frame, a discharging conveyor mounted at its receiving end on said base frame adjacent to the pivotal mounting of said super-frame, said discharging conveyor having its receiving end positioned under the discharge end of said gathering and conveying trough, and power means for driving both conveyors mounted on said super-frame under said trough, whereby the overall height of the loading machine is not more than 25 inches.

CHARLES N. BEBINGER.